June 7, 1960  A. FRÖHLICH ET AL  2,939,175
TWO-WAY EXPANDABLE INNER BEAD FORMING RING FOR VULCANIZING PRESSES
Filed Feb. 13, 1956  2 Sheets-Sheet 1

INVENTORS
ADOLF FRÖHLICH &
EDWARD J. HARRIS
BY L. William Freeman
ATTORNEY

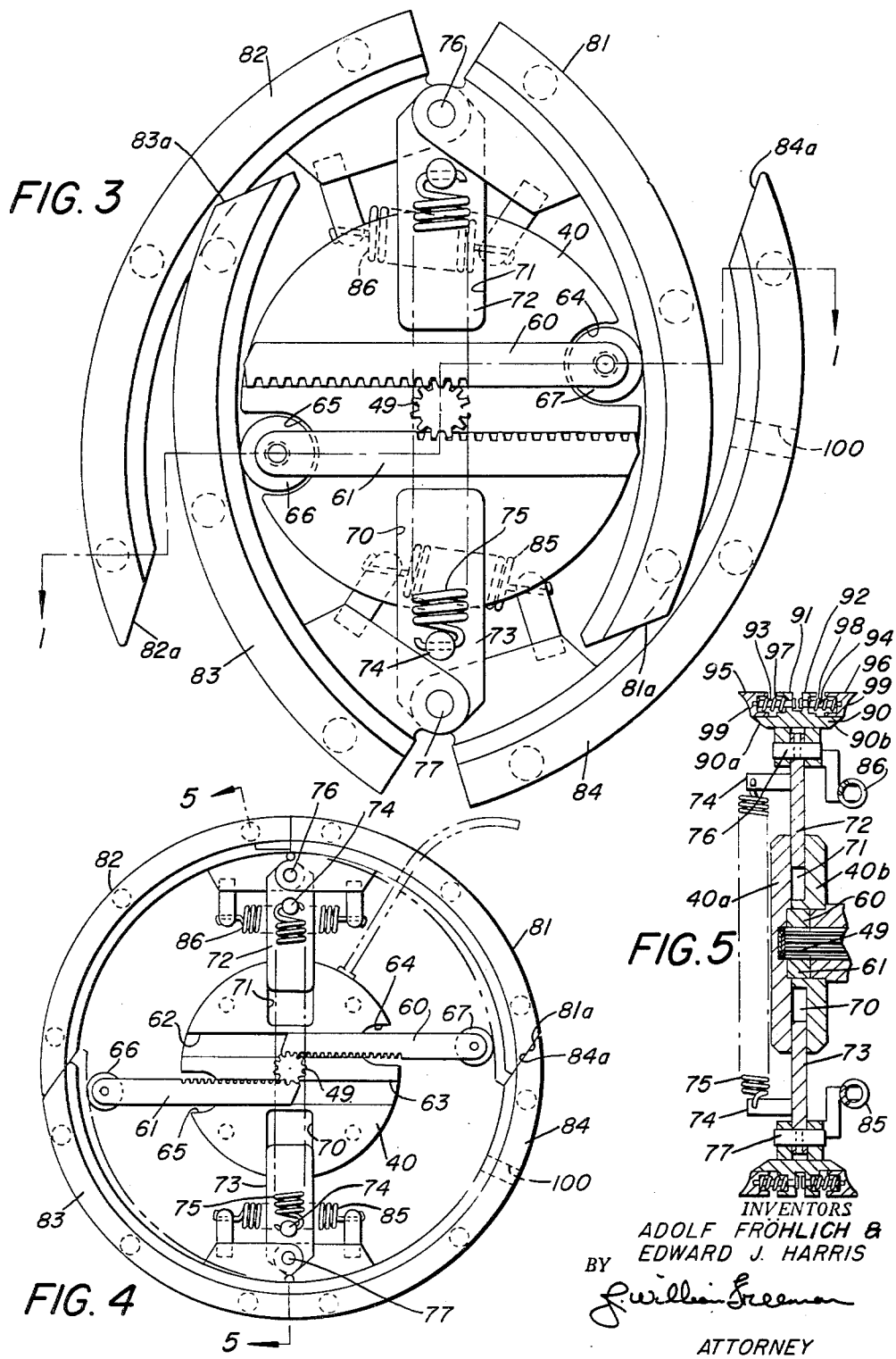

United States Patent Office 2,939,175
Patented June 7, 1960

2,939,175

TWO-WAY EXPANDABLE INNER BEAD FORMING RING FOR VULCANIZING PRESSES

Adolf Fröhlich and Edward J. Harris, Akron, Ohio, assignors to The Cleveland Trust Company, Cleveland, Ohio, as trustee Filed Feb. 13, 1956, Ser. No. 564,955

7 Claims. (Cl. 18—17)

This invention relates to the art of pneumatic tire vulcanization, and in particular has reference to a new and improved type of inner bead ring forming and sealing device capable of utilization in the vulcanizing operation of pneumatic tire construction.

In the past, the manufacture of pneumatic tires has been effectuated by first forming a plurality of fabric plies in flat form so as to build up a plurality of such layers in what is conventionally referred to as a "flat-built" tire. This "flat-built" tire is then positioned in a vulcanizing press where the same is shaped to a toroidal configuration by the use of a pneumatic former that is automatically positioned interiorly of the tire during the vulcanizing operation.

While the above type of structure has been generally accepted, the same has been found disadvantageous in that it requires the use of a relatively complex mechanism to effectuate the timed entrance and withdrawal of the pneumatic former. Additionally, such formers have been found to have a relatively short duration of use and must be accordingly replaced frequently to thus add to the overall cost of manufacturing with an attendant increase in the cost of the overall tire per se.

It has been proposed in the past to vulcanize pneumatic tires without the use of a pneumatic former of the type above described. However, such efforts have been unsatisfactory, in view of the fact that it was heretofore impossible to provide an efficient type of inner bead ring mechanism that would serve the dual purpose of creating an air-tight seal at the bead area of the tire being cured, while simultaneously being easy to install and remove prior to and after the vulcanizing cycle.

With specific reference to the problem of creating an air-tight seal in the internal bead walls, it has been conventional practice in the past to make an annular ring of fixed radial and axial dimensions that is positioned between the tire beads upon closure of the mold sections. Because of the fixed axial dimension of such rings, it becomes apparent that the same are not able to automatically compensate for any variation in spacing that exists between the spaced bead walls after the same have been formed. Thus if the cross-sectional diameter of these bead sections has been made undersize during the tire building operation, it is apparent that the fixed diameter ring will not be able to axially expand to seal off the void that occurs in such cases. In contrast, if said bead sections are made oversize it becomes apparent that extreme pressure will be exerted upon the same, with the result that deformation will occur to the detriment of the ultimate product.

In addition to this disadvantage, present day sealing rings of this type are impractical due to the fact that the same are provided with a fixed radial dimension. Because the extreme periphery of such rings must be received interiorly of the bead portion of the firmed tire T, it is apparent that sealing rings of this type are in reality, oversize with respect to the diameter of the bead portions, and accordingly, the same must be hand-placed inside of the tire. It follows that during such placement operation, the tire must be somewhat deformed to permit passage of the ring therethrough, due to the fact that the ring diameter is greater than the bead diameter. It is believed apparent that although inconvenient this type of ring may be utilized in smaller size tires such as passenger tires. However, when larger size tires having a greater number of fabric plies are encountered as in the case of manufacturing truck tires, for example, then the manual positioning of the ring becomes virtually impossible, with the result that the positioning and removal thereof must be done by automatic equipment of an expensive and complex nature.

In co-pending application of Adolf Fröhlich and Edward J. Harris, for Expandable Bead Ring for Vulcanizing Presses, Serial No. 530,381, filed August 24, 1955, there was disclosed an improved type of bead ring that overcame the objections above set forth, in view of the fact that the same had the radial dimension thereof expandable so that the overall ring could be contracted during the mounting of the tire on the vulcanizing press, and then could be expanded radially for effectuating the requisite seal between the beads.

While the subject matter of the above referred to copending application has been found satisfactory in general, it is found that the same does not in all cases, completely overcome the bead sealing disadvantage discussed above, in view of the fact that the improved ring of the co-pending application does not have any provision therein for making the opposed bead sealing faces axially shiftable with respect to each other.

It accordingly becomes a principal object of this invention to provide an improved type of bead ring sealing mechanism for use in bagless vulcanizing presses that is characterized by the fact that the bead ring is capable of expanding and contracting both radially and axially in its overall dimensions to thus facilitate ease in removal and insertion of the same with respect to the pneumatic tire being vulcanized.

It is a further object of this invention to provide an improved type of vulcanizing press having as an integral part thereof a bead ring that is radially and axially expansible, with said radial and axial expansion thereof automatically occurring upon closing movement of the vulcanizing press.

These and other objects of the invention will become more apparent upon a reading of the following brief specification, considered and interpreted in the light of the accompanying drawings.

Of the drawings:

Figure 3 is a view taken on the lines 3—3 of Figure 1.

Figure 4 is a view taken on the lines 4—4 of Figure 2.

Figure 5 is a view taken on the lines 5—5 of Figure 4.

Figure 1:
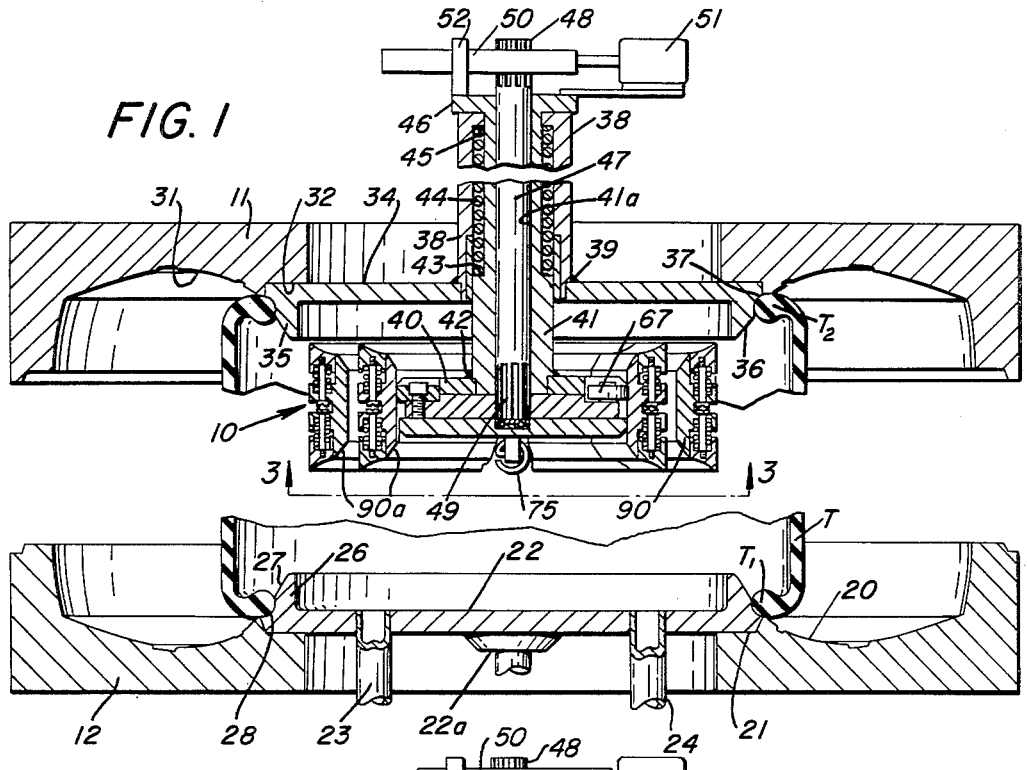
Figure 1 is a sectional view partly broken away and in section and illustrating the improved sealing ring being positioned intermediate of the upper and lower mold sections of a vulcanizing press that is in partially closed condition.

Referring now to the drawings, and in particular to Figure 1 thereof, the improved bead ring, generally designated by the numeral 10, is shown carried by the upper mold section 11 of a vulcanizing press (not shown) so as to coact with certain component parts of a lower mold section 12, to accordingly effectuate a vulcanization of an uncured pneumatic tire T that is deformed to toroidal shape upon closing of the above-described mold sections 11 and 12, as will be presently described.

Figure 2:
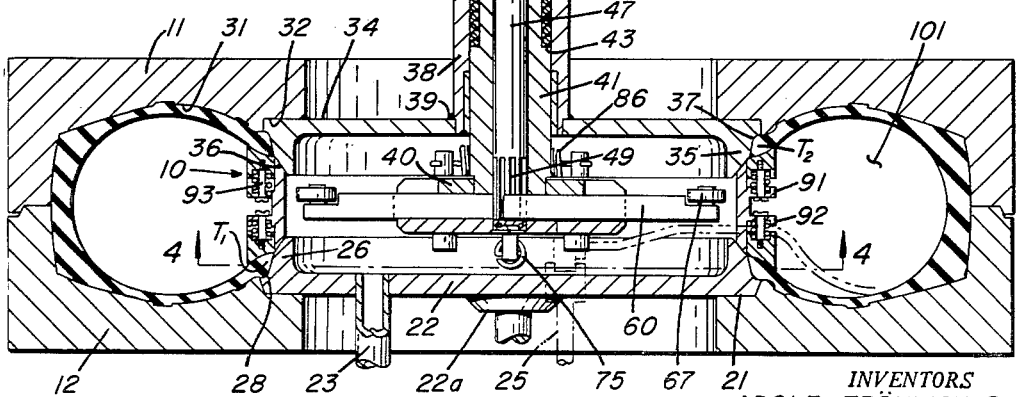
Figure 2 is a view similar to Figure 1, but showing the component parts in the closed position thereof.

Considering first the structure of the lower mold section 12, it will be seen that the same includes the usual design-imparting cavity 20 that terminates adjacent the bead portion thereof in an undercut 21 that serves as a seat for a plate member 22. While not shown in the drawings, it is to be understood that the plate member 22 may be attached to known type bead ejection mechanisms that could be carried by boss 22a that is provided on the underside of plate 22. Such an arrangement would permit the plate 22 to move axially of the lower mold section 12 for the purpose of stripping the finished tire T from the lower mold section 12 upon completion of the vulcanization cycle. In addition, the plate 22 is shown as further including a pair of conduits 23 and 24, with the conduit 23 serving as a source of vulcanizing medium, while the conduit 24 may be in the form of a suction line for withdrawing condensate from the interior of the tire through the flexible hose 25 that is illustrated in chain-dotted lines in Figure 2 of the drawings. As best shown in Figures 1 and 2 of the drawings, the peripheral edge portion of the plate 22 is formed as a continuous upturned flange 26 that has the extreme radial surface thereof defined by a tapered surface 27 and a circular bead seat 28; the arrangement being such that the lower bead portion $T_1$ of tire T (see Figures 1 and 2) may be received on the bead seat 28, while the inclined surface 27 coacts with certain component parts of the ring member 10, as will be presently described.

Considering next the structure of the upper mold section 11, it will be seen that the same includes a design-imparting surface 31 that is undercut at the bead area thereof to define a circular seat 32 upon which a plate 34 may be seated. As in the case of the lower plate 22, this upper plate 34 includes a peripheral flange 35 that has an inclined surface 36 as well as a circular bead seat 37 against which the upper bead $T_2$ of the tire T may be received, as shown in full lines in Figure 1. Additionally, the plate 34 is shown centrally apertured for reception of a tubular housing 38 that is welded thereto as at 39 so as to be fixed with respect to the upper plate 34.

Considering now the detailed structure of the expandable ring 10, it is first to be noted that the overall ring 10 is in general, capable of three distinct and different types of movement. First, the same is shiftable axially with respect to the cylindrical housing 38 to effectuate positioning during closing. Second, the same is radially expansible from the position of Figure 1 to the position of Figure 2. Third, the opposed bead-engaging portions thereof are axially movable with respect to each other, under tension.

With the foregoing in mind, it is to be first noted that the ring member 10 includes a main or central plate 40 that is generally of circular configuration as shown in Figures 3 and 4 of the drawings, and which has projecting axially therefrom a tubular sleeve designated by the numeral 41, with this tubular sleeve 41 being shown secured with respect to the plate 40 by weld 42. As shown in Figures 1 and 2, tubular member 41 has the external diameter thereof reduced to define a shoulder 43 against which seats one end of a spring 44, with the other end of spring 44 seating against a similar undercut 45 that is provided on the internal wall of the tubular housing 38 adjacent one axial end thereof. In this manner, the members 38 and 41 are telescoped with respect to each other and are accordingly capable of relative axial movement, with the spring 44 tending to urge the members 41 and 38 to the position of Figure 1. In this regard, cap 46 limits the downward movement of the cylindrical member 41, so that the same can move downwardly only to the position of Figure 1 at which point the same is suspended.

In addition to the aforementioned component parts, the internal cylindrical surface 41a of the cylindrical member 41 is shown as telescopically receiving therein a shaft 47 that has the opposed axial ends thereof defined by splines 48 and 49, with the uppermost spline 48 being engaged by a rack 50 that has one end thereof actuated by a hydraulic cylinder 51 carried on cap member 46, as shown in Figures 1 and 2 of the drawings. Additionally, a support 52 is provided adjacent the opposed axial end of the rack 50 to guide the same during the period that the rack 50 is meshing with the gear spline 48.

As best shown in Figure 4 of the drawings, the remaining spline 49 is shown as having opposed arcuate surfaces thereof meshing with racks 60 and 61 that are respectively received within appropriate radial slots 62 and 63 that are defined by central plate 40. In addition, in order to permit the maximum contraction to the position of Figure 3, the plate 40 is shown undercut as at 64 and 65 so as to permit reception of roller members 66 and 67 that are respectively attached to the free ends of the rack members 60 and 61, respectively.

In addition to the aforementioned component parts, the main or central plate 40 also defines a pair of radial slots 70 and 71 that have respectively received therein a pair of elongate shank members 72 and 73, with pin members 74, 74 being provided on said elongate shanks 72 and 73 to permit a spring 75 to be interposed therebetween, as best shown in Figure 5 of the drawings.

With regard to the manner in which the various slots 62, 63, 70 and 71 are provided in the plate 40, particular reference is had at this point to Figure 5 of the drawings, wherein these slots are shown as being defined by a pair of plates 40a and 40b that are joined together to define the overall plate 40. In this manner, it is believed clear by the use of these abutting plate members 40a and 40b that an overall plate 40 can be provided that will include radial slots such as the slots 70 and 71, and also the appropriate slots 62 and 63 that are required for the rack members 60 and 61.

As best shown in Figure 3, the radially outermost ends of the shank members 72 and 73 include pivot pins 76 and 77, about which are mounted a series of arcuate ring segments generally designated by the numerals 81, 82, 83 and 84; the arrangement being such that the arcuate segments 81 and 82 are mounted about the pin 76, while the lowermost segments 83 and 84 (see Figure 3) are mounted about the pin 77, with spring 85 connecting members 83 and 84, and spring 86 connecting members 81 and 82 to normally hold the same in the position of Figure 3; with the limit of such pivotal movement being determined by contact of rollers 66, 67 with segments 83 and 81, respectively.

As is best shown in Figures 1 and 5 of the drawings, each arcuate segment 81, 82, 83 and 84 is substantially similar in cross-section, and accordingly has its extreme peripheral portion thereof axially adjustable. To the the end of accomplishing this result, each segment 81, 82, 83 and 84 includes an arcuate ring portion 90 that has radially projecting flange members 91 and 92 that serve as seats for pin members 93 and 94, respectively. In addition, each arcuate ring section 81, 82, 83 and 84 further includes spaced bead-engaging members that are designated by the numerals 95 and 96 as shown in Figure 5; with the bead-engaging member 95 being mounted with respect to the pin 93, while the bead-engaging portion 96 is mounted with respect to pin 94. In this manner, the use of springs 97 and 98 will urge the members 95 and 96 respectively away from the radial flanges 91 and 92 so that the bead-engaging surfaces 99, 99 thereof may be engaged under tension against the tire T as best shown in Figure 2 of the drawings.

In use or operation of the improved sealing ring during vulcanizing, it will first be assumed that the component parts are in the partly closed position of Figure 1, with seat 37 of ring 34 being in contact with the upper bead portion $T_2$ of the tire T, that has previously had the lower bead portion $T_1$ thereof mounted on the circular bead seat 28 of ring 22. In this regard, it will be noted that the ring 22 may have been moved into an extended position (not shown) during the positioning of the tire T thereon, but it will be assumed further that the ring 22 has been retracted to the position of Figure 1 prior to closing of the mold sections 11 and 12.

In this condition, it will be noted that the overall ring unit 10 is suspended between the plates 22 and 34, with the same being in the extreme down position with respect to plate 34 as a result of the cap 46 resting against the upper end of cylindrical housing 38. It is to be understood that in this condition, the telescoped housing 41 that is secured to the cap 46 may move upwardly of Figure 1, with the result that the spring 44 will be compressed. Also, as shown in Figure 3, the overall ring 10 will be collapsed to an oval shape.

When the mold sections 11 and 12 have closed to the position of Figure 1 and the bead sections $T_1$ and $T_2$ have respectively become engaged with the bead seats 28 and 37 respectively, the ring 10 may be radially expanded as a result of actuation of the hydraulic member 51. Such actuation will move the rack 50 to the left of Figure 1 so that the spline 48, as a result of being meshed with rack 50, will turn in a clockwise direction as shown in Figures 1 and 4 of the drawings. As a result of this clockwise movement of the spline 48, it is apparent that a similar clockwise rotation will occur with respect to the spline 49 and this clockwise rotation of the spline 49 will operate to move the rack members 60 and 61 radially outwardly towards the position Figure 4 of the drawings. During the time that the rack members 60 and 61 are being moved outwardly, it is apparent that the roller members 66 and 67 will respectively engage the arcuate segments 83 and 81 and continued radial movement of the rack members 60 and 61 will operate to move these arcuate members 83 and 81 about their respective pivot points 77 and 76. This contact between the roller members 66 and 67 and the arcuate segments 83 and 81 will additionally cause the pivot points 77 and 76 to radially expand against the force afforded by the spring 75, with the result that the same will move outwardly of the slots 70 and 71 to assume the position of Figure 4 of the drawings. During such pivotal movement of the arcuate segments 83 and 81, as first described it is believed apparent that the members 82 and 84 will similarly pivot about pins 76 and 77, respectively, as a result of arcuate ends 83a and 81a contacting the members 82 and 84, respectively. It is to be noted in this regard that the members 82 and 84 radially overlap the members 83 and 81; and in this regard, the members 82 and 84 have one arcuate end thereof provided with tapered ends 82a and 84a that are complemental with respect to the ends 83a and 81a, with which the same respectively engage in complemental relationship as shown in Figure 4 of the drawings.

When the ring 10 has been radially expanded so that the position of Figure 4 has been reached, it is apparent that the bead-engaging surface 99 of member 95 will come in contact with the internal surface of the bead $T_1$ upon further closing movement of the press, and during such establishment of contact it is to be noted that the ring 10 will be guided into position of concentricity with respect to mold section 12, as a result of the complemental engagement between the tapered surface 27 and a correspondingly tapered surface 90a that is provided on each individual peripheral ring member 90 of each arcuate section 81, 82, 83 and 84. It will be similarly noted in this regard that as the mold section 11 descends towards the position of complete closure that is illustrated in Figure 2 of the drawings, that the tapered surface 36 of plate 34 will be engaged by the surface 90b that is provided on each peripheral ring segment 90 (see Figures 1 and 5).

When the mold sections 11 and 12 have been completely closed as shown in Figure 2 of the drawings, it is apparent that the opposed bead seats 99, 99 that are provided on the individual segments 96, 96 will be tensionally engaged against the internal bead surface of the upper bead $T_2$, with springs 97 and 98 urging the members 95 and 96 apart.

At this time, vulcanizing medium may be introduced through the conduit 23, and in this regard, it is to be noted that in the preferred form of the invention, any one of the individual ring segments 81, 82, 83 and 84 can be provided with an aperture 100 therein for the purpose of permitting the steam to enter the interior chamber 101 of the formed tire as shown in Figure 2. As an alternative in this regard, it is to be noted that a flexible hose could be connected between the conduit 23 and the aperture 100 so that the interior volume that is defined by the plates 22 and 34, and the ring segments 81, 82, 83 and 84 could be devoid of vulcanizing medium during the actual operation. Also, it is believed manifest that gaskets or other sealing devices could be provided on both the arcuate and axial end portions of the individual segments 81, 82, 83 and 84 so that these members coact together to form a complete sealing ring.

During the vulcanizing operation, it is believed apparent that the condensate occurring interiorly of the chamber 101 can be removed by merely applying suction to the line 24 which will cause such condensate to enter the conduit 25 for withdrawal through line 24.

After the vulcanizing period has been completed, the mold sections 11 and 12 may be slightly separated so as to strip the cured tire T with respect to the upper mold section 11, with such stripping occurring as a result of bead $T_1$ being clamped between ring 10 and seat 28. During this stripping movement the hydraulic means 51 may be energized in the opposite direction to cause the rack 50 to move to the right of Figure 1, with the result that counter-clockwise movement of the shaft 47, and splines 48 and 49 will occur. This counter-clockwise movement will result in reverse movement of racks 60 and 61, with the result that the springs 75, 85 and 86 will coact together to collapse the individual segments 81, 82, 83 and 84 to the oval-shaped position of Figure 3, with such collapsing effectuating withdrawal of the individual segments 81, 82, 83 and 84 between bead sections of the cured tire.

With the bead ring 10 thus removed with respect to the cured tire T, the mold section 11 may be moved upwardly to the fully open position, and the ejection means (not shown) may be operated to unseat the plate 22 with respect to the lower mold section 12; and at this time the tire may be easily removed by merely lifting the same from the circular bead seat 28.

At this time, a new uncured tire T may have the bead portion $T_1$ thereof positioned, on the seat 28 and extended plate 22 for repetition of the above cycle.

It will be seen from the foregoing that there has been provided a new and highly efficient type of improved sealing ring that is expandable in both its radial and axial dimensions so as to simultaneously be capable of automatic withdrawal while effectuating an efficient bead seal during the vulcanizing period.

In accordance with the patent statutes, a detailed description of the preferred embodiment of the invention has been related. It is to be noted, however, that such detailed specification is not intended to limit or otherwise restrict the scope of this invention that is limited only by the scope of the ensuing claims. Accordingly, it is believed apparent in this regard, that other means may be utilized to shift the sealing ring per se between the circular and oval-shaped condition of Figures 3 and 4. Similarly, other means such as hydraulic pistons could be employed in lieu of the illustrated springs to cause the axial separating of the bead-engaging surfaces of the sealing ring. It is also to be understood that where the term "sealing" has been used to describe the ring member, that this includes a forming action that occurs against the inner bead surfaces.

It accordingly follows that other modifications of the invention may be resorted to without departing from the spirit thereof or the scope of the appended claims.

This application is a continuation-in-part of copending application Serial No. 530,381, of Adolf Fröhlich and Edward J. Harris, filed August 24, 1955, now Patent No. 2,904,832.

What is claimed is:

1. A vulcanizing press of the character described, comprising; a pair of relatively movable, complemental mold sections; bead ring means carried about its axis by one said mold section in axially shiftable relationship therewith and having axially spaced and axially shiftable bead engaging surfaces; means for varying the maximum transverse dimension of said ring means; said ring means including a fixed diameter plate; a pair of radially opposed spoke members, projecting radially of said plate; a first pair of arcuate segments respectively pivoted about the free ends of said spoke members; a second pair of arcuate segments respectively pivoted about the free ends of said spoke members with said first and second pairs of arcuate segments pivoting through a plane common to said plate; and means for pivoting said first pair of arcuate segments about their pivot points; said second pair of arcuate segments radially overlapping said first pair of arcuate segments, whereby pivotal movement of said first pair of arcuate segments results in pivotal movement of said second pair of arcuate segments; said first and said second pairs of arcuate segments defining when pivoted, a circular ring said points of pivotal connection being shiftable radially of said plates.

2. A vulcanizing press of the character described, comprising; a pair of relatively movable, complemental mold sections; bead ring means carried about its axis by one said mold section in axially shiftable relationship therewith and having axially spaced and axially shiftable bead engaging surfaces; means for varying the maximum transverse dimension of said ring means; said ring means including a fixed diameter plate; a pair of radially opposed spoke members, shiftable radially of said plate and projecting radially thereof; a first pair of arcuate segments respectively pivoted about the free ends of said spoke members; a second pair of arcuate segments respectively pivoted about the free ends of said spoke members with said first and second pairs of arcuate segments pivoting through a plane common to said plate; and means for pivoting said first pair of arcuate segments about their pivot points; said second pair of arcuate segments radially overlapping said first pair of arcuate segments, whereby pivotal movement of said first pair of arcuate segments results in pivotal movement of said second pair of arcuate segments; said first and said second pairs of arcuate segments defining when pivoted, a circular ring said points of pivotal connection being shiftable radially of said plates.

3. The device of claim 2 further characterized by the presence of means for urging said spokes radially inward.

4. The device of claim 2 further characterized by the presence of means urging said segments towards each other around their point of pivoting on said spoke members.

5. A vulcanizing press of the character described, comprising; a pair of relatively movable, complemental mold sections; bead ring means carried about its axis by one said mold section in axially shiftable relationship therewith and having axially spaced and axially shiftable bead engaging surfaces; means for varying the maximum transverse dimension of said ring means; said ring means including a fixed diameter plate; a pair of radially opposed spoke members, projecting radially of said plate; a first pair of arcuate segments respectively pivoted about the free ends of said spoke members; a second pair of arcuate segments respectively pivoted about the free ends of said spoke members with said first and second pairs of arcuate segments pivoting through a plane common to said plate; and means for pivoting said first pair of arcuate segments about their pivot points; said second pair of arcuate segments radially overlapping said first pair of arcuate segments, whereby pivotal movement of said first pair of arcuate segments results in pivotal movement of said second pair of arcuate segments; said first and said second pairs of arcuate segments defining when pivoted, a circular ring; said means for pivoting said first pair of arcuate segments including a rack and pinion said points of pivotal connection being shiftable radially of said plates.

6. A vulcanizing press of the character described, comprising; a pair of relatively movable, complemental mold section; bead ring means carried about its axis by one said mold section in axially shiftable relationship therewith and having axially spaced and axially shiftable bead engaging surfaces; means for varying the maximum transverse dimension of said ring means; means for urging said bead engaging surfaces axially apart under pressure; said ring means including a fixed diameter plate; a pair of radially opposed spoke members, projecting radially of said plate; a first pair of arcuate segments respectively pivoted about the free ends of said spoke members; a second pair of arcuate segments respectively pivoted about the free ends of said spoke members with said first and second pairs of arcuate segments pivoting through a plane common to said plate; and means for pivoting said first pair of arcuate segments about their pivot points; said second pair of arcuate segments radially overlapping said first pair of arcuate segments, whereby pivotal movement of said first pair of arcuate segments results in pivotal movement of said second pair of arcuate segments; said first and said second pairs of arcuate segments defining when pivoted, a circular ring said points of pivotal connection being shiftable radially of said plates.

7. A vulcanizing press of the character described, comprising; a pair of relatively movable, complemental mold sections; bead ring means carried about its axis by one said mold section in axially shiftable relationship therewith and having axially spaced and axially shiftable bead engaging surfaces; means for varying the maximum transverse dimension of said ring means; means for urging said bead engaging surfaces axially apart under pressure; said ring means including a fixed diameter plate; a pair of radially opposed spoke members, projecting radially of said plate; a first pair of arcuate segments respectively pivoted about the free ends of said spoke members; a second pair of arcuate segments respectively pivoted about the free ends of said spoke members with said first and second pairs of arcuate segements pivoting through a plane common to said plate; and means for pivoting said first pair of arcuate segments about their pivot points; said second pair of arcuate segments radially overlapping said first pair of arcuate segments, whereby pivotal movement of said first pair of arcuate segments results in pivotal movement of said second pair of arcuate segments; said first and said second pairs of arcuate segments defining when pivoted, a circular ring; said means for pivoting said first pair of arcuate segments including a rack and pinion said points of pivotal connection being shiftable radially of said plates.

References Cited in the file of this patent

UNITED STATES PATENTS

| 1,734,835 | Strum | Nov. 5, 1929 |
| 1,757,376 | Laursen | May 6, 1930 |
| 2,042,498 | Bostwick | June 2, 1936 |
| 2,514,215 | Stevens et al. | July 4, 1950 |
| 2,561,573 | Hovlid et al. | July 24, 1951 |
| 2,571,258 | Kolins | Oct. 16, 1951 |
| 2,763,317 | Ostling et al. | Sept. 18, 1956 |